Figure 5:
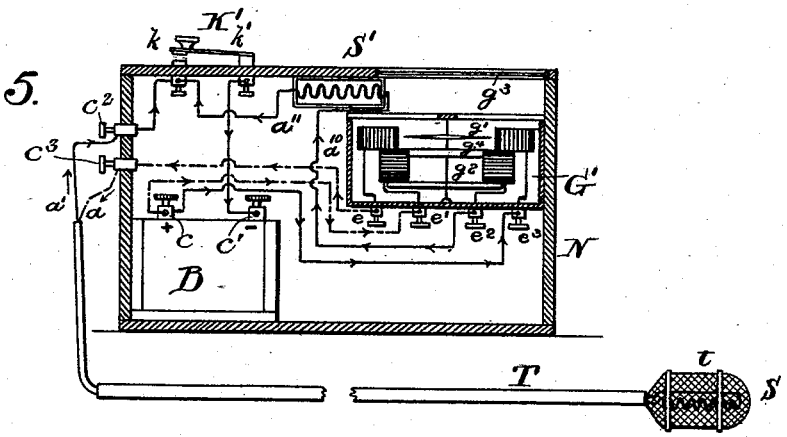

(No Model.) 2 Sheets—Sheet 1.
B. C. TILGHMAN, Jr.
METHOD OF AND APPARATUS FOR DETECTING AND MEASURING INFLAMMABLE GASES.
No. 524,361. Patented Aug. 14, 1894.
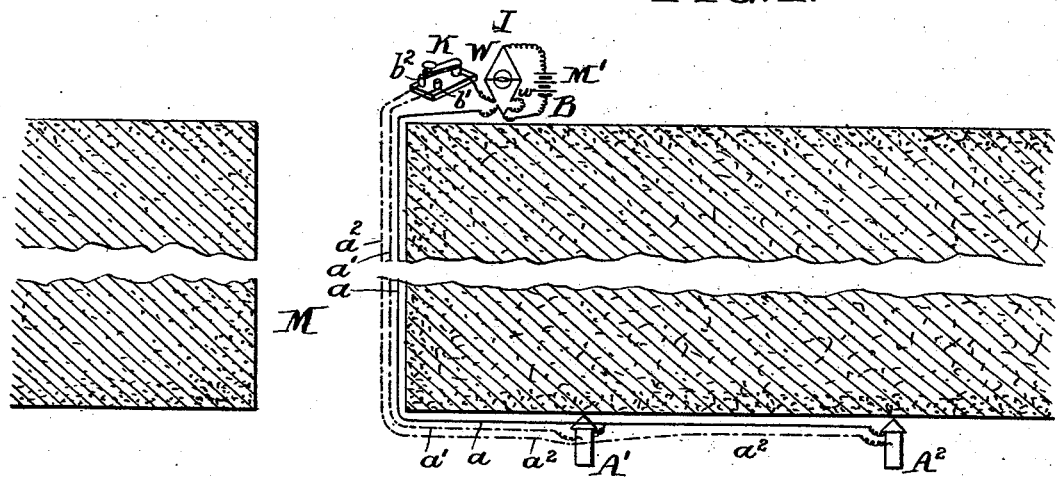
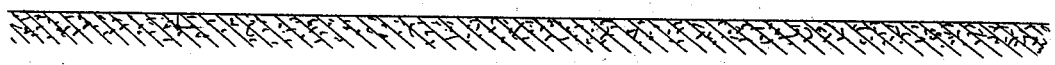
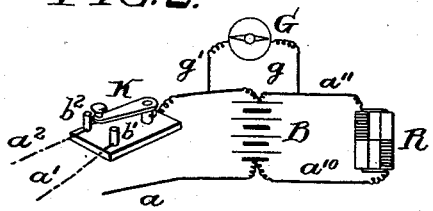
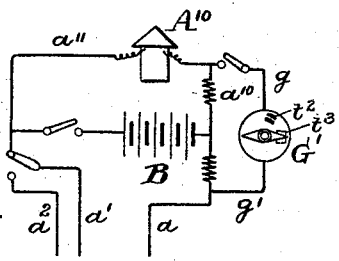
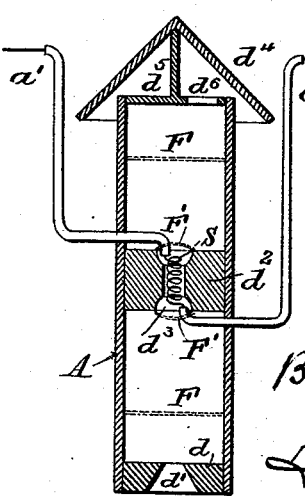
WITNESSES:
Edw. F. Ayres
D. Stewart
INVENTOR:
Benjamin C. Tilghman Jr
by his atty.
Francis T. Chambers
THE NORRIS PETERS CO., PHOTO-LITHO., WASHINGTON, D. C.

(No Model.) 2 Sheets—Sheet 2.

B. C. TILGHMAN, Jr.
METHOD OF AND APPARATUS FOR DETECTING AND MEASURING
INFLAMMABLE GASES.

No. 524,361. Patented Aug. 14, 1894.

WITNESSES:
Edw. F. Ayres
D. Stewart

INVENTOR:
Benjamin C. Tilghman, Jr.
by his atty.
Francis T. Chambers

UNITED STATES PATENT OFFICE.

BENJAMIN C. TILGHMAN, JR., OF PHILADELPHIA, PENNSYLVANIA.

METHOD OF AND APPARATUS FOR DETECTING AND MEASURING INFLAMMABLE GASES.

SPECIFICATION forming part of Letters Patent No. 524,361, dated August 14, 1894.

Application filed March 14, 1893. Renewed January 12, 1894. Serial No. 496,685. (No model.)

*To all whom it may concern:*

Be it known that I, BENJAMIN C. TILGHMAN, Jr., a citizen of the United States, residing in the city and county of Philadelphia, in the State of Pennsylvania, have invented a certain new and useful Improvement in Methods of and Apparatus for Detecting and Measuring the Presence and Amount of Inflammable Gases or Vapors Mixed with Air, of which the following is a true and exact description, reference being had to the accompanying drawings, which form a part of this specification.

My invention relates to an improvement in the method of and apparatus for detecting the presence and measuring the amount of inflammable gases or vapors contained in the air of mines, oil tanks, and similar places where such gases are apt to occur. It is well known that if a thin wire or strip of metal be arranged so as to be heated to a suitable temperature by proper means, as by an electric current of suitable quantity passing through the strip, that if there are any inflammable gases or vapors in the air surrounding the wire so heated, that these inflammable gases will be burned on the surface of the heated wire; and the wire will consequently be heated by the burning of the inflammable gases and the passage of the electric current to a higher temperature than the passing of the electric current alone would effect. This increase in heat in the wire due to the burning of the inflammable gases has a fixed relation to the amount of gas present in the surrounding atmosphere and burned on the surface of the wire or metal strip. It is also well known that certain metallic conductors, as for instance, platinum, increase their electrical resistance on an increase of temperature, and in a fixed ratio to this increase of temperature. Therefore, by properly arranging a circuit, including a suitable wire or strip of metal, so that it will be carried into a place or places where the condition of the air is to be tested, passing a suitable current of electricity through it and measuring the increase of resistance due to inflammable gas, if any, occurs, over the normal resistance of the circuit due to the passage of the electric current alone the amount of inflammable gases can be ascertained, and that too without the necessity of the observer going to the place to be tested, which might be dangerous to do, and by this process also, the indications given are positive and do not in any way depend upon the judgment of the person making the test but on a properly constructed instrument may be read off in per cents of inflammable gas in the air.

My invention consists in an apparatus and method of operation designed to accomplish this end, also in a special form of galvanometer designed to be used in connection therewith and also in an arrangement of the apparatus so that it may be compact and portable.

My invention is illustrated in the accompanying drawings, in which—

Figure 6:
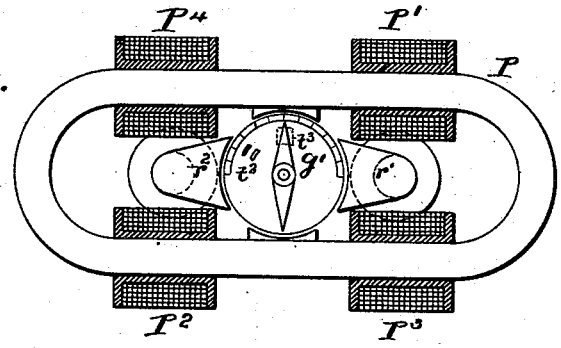
Figure 7:
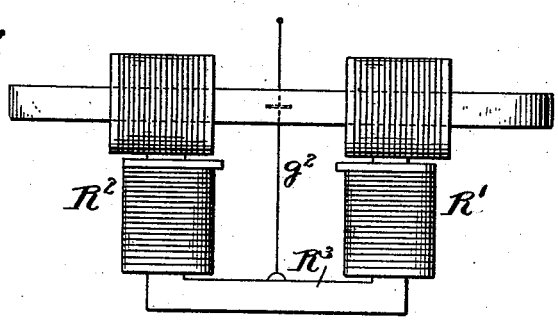
Figure 8:
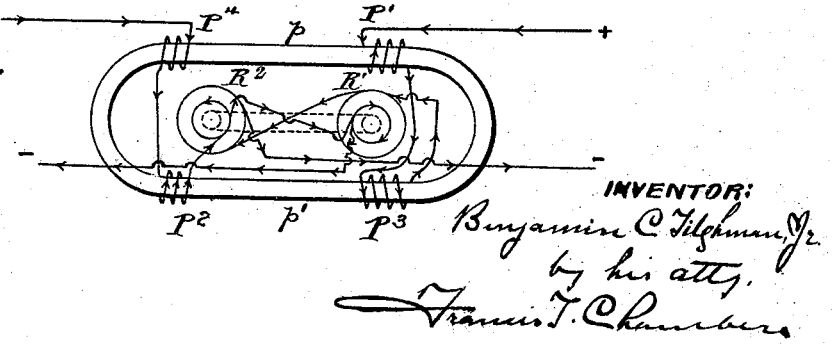

Figure 1 is a diagrammatic view showing a convenient mode of arranging the apparatus in a mine shaft. Fig. 2 is a diagram of a modified form of determining apparatus. Fig. 3 is a diagram illustrating another form of determining apparatus. Fig. 4 is a section of a casing designed to protect the testing spiral. Fig. 5 is a side view partly in section of a portable arrangement of my testing apparatus. Fig. 6 is a plan view of a differential galvanometer specially designed for quick measurements. Fig. 7 is a side view of the galvanometer, showing the arrangement of the lower electro-magnet, and Fig. 8 is a diagrammatic view showing the windings of the magnet.

M, represents the shaft of a mine, and A' and $A^2$ places where it is desired to test the presence of inflammable gases.

M' is a station at any suitable place, as at the mouth of the shaft, where it is desired to observe and record the condition of the air at the different testing stations in the mine.

B, is a suitable source of electrical supply, here shown as a battery, $a$, a line wire, and $a'$ $a^2$ return wires from the stations A' $A^2$ respectively. These return wires may conveniently end at contact points as $b'$ $b^2$ and a key as K is preferably so arranged that any one of the circuits may be closed at pleasure.

A suitable indicator I is arranged in circuit, preferably at the station M' and near to the key K, which shows at any desired distance from a testing station A' or $A^2$, &c., the resistance in the circuit due to the heating of the metal strip introduced therein at the testing stations, and so the amount of inflammable gases at said stations.

Before describing the details of the apparatus and the various means which may be used to indicate the amount of resistance in the circuit, I would remark that the substance introduced into the circuit at the testing station should have an appreciable resistance in relation to the rest of the circuit, so that the variations of resistance under the different percentages of gases or vapors, may be measured without the use of instruments of excessive refinement, and the most convenient substance I have contemplated using is a thin wire of platinum preferably wound in a spiral to present as much surface as possible to the air. The current to be used may be such as will heat the platinum spirals to a temperature at which they will be just below visible redness in the dark, though I have found that if the current used is much stronger, so that the spirals will glow brightly, that the increase in resistance under the same proportions of gas or vapor in the air will be practically the same as when less strength of current is used; I prefer however to use a current which will heat the spiral to such a temperature as will cause it to be barely luminous in diffused daylight. The increase in temperature of the spiral over that induced by the current is due, as has been said, to the amount of inflammable gas burned on its surface, but if there is a current of comparatively cool air flowing quickly over the surface of the heated spiral the temperature of the spiral falls about proportionally, to the quickness of the current of air in which the testing wire is situated. The effect of an unduly quick current is therefore to show apparently less inflammable gas present in the air of this current than really exists therein. In order to avoid having the indications affected in this way I prefer to inclose the spiral in a casing so constructed, that while a perfectly free access of air is permitted to the testing spiral, a draft of air in the shaft in which the spiral is placed will have no effect on it.

Returning now to the drawings, A, Fig. 4, represents a casing in which the spiral S of platinum wire is inclosed and it may conveniently be constructed as shown, where it consists of a box preferably long in comparison to its width and breadth and conveniently made of metal. At the lower end is a cover $d$ partly closing the bottom of the box but having an opening $d'$ preferably arranged with inclined edges as shown. At about the center of the box or casing I arrange a spiral S of suitable metal as explained, preferably surrounding it with some refractory substance which is not a good conductor of heat or electricity such as fire-brick or asbestos. This is preferably arranged as a block $d^2$ as shown, having a hole $d^3$ therein which forms a flue or chimney so that all the air going through the casing will pass close to the spiral. At the top of the casing is arranged a cover $d^5$ with holes $d^6$ therein and a sloping roof as $d^4$ is preferably arranged over the whole and acts with the cover $d$ as baffles to prevent any outside draft from having effect on the spiral within the casing. The spiral, however, when heated, heats the air surrounding it which rising, creates a draft in the casing A and so furnishes continually a fresh supply of air to act on the spiral, which supply is dependent on the heat of the spiral, and independent of any draft in the mine shaft.

In order to prevent the ignited gases from setting fire to or exploding the inflammable gases in the surrounding atmosphere, sheets of gauze, F F' as many as are deemed necessary are placed above and below the spiral in any convenient manner.

For measuring the resistance of the circuit any proper instrument may be used. For the measurement of the resistances in circuits where the air to be tested is at any considerable distance from the place at which the indications are read, the Wheatstone bridge method I consider preferable, in this as shown at W, Fig. 1, a suitable comparing resistance being introduced as at $w$, the variations in the main circuit can be easily read off by proper manipulation of the instrument. A rheostat R as shown in Fig. 2 may also be used and resistance added or subtracted till the resistance in the circuit $a^{10}$ $a^{11}$ balances that in the main circuit as will be seen from an ordinary galvanometer G connected to the two circuits by short wires as $g$ $g'$. Any proper means for measuring resistance may of course be used and I do not wish to be considered as limiting myself to any particular means shown.

In cases where a fixed resistance is used against that of the testing wire or strip, said fixed resistance being practically unchanged by the current flowing through it, then the connection with the indicating instrument should not be made until such time as the testing wire or strip has attained a steady temperature, and therefore a steady electrical resistance under the joint effects of the testing current and whatever inflammable gases or vapor may be present in the air being tested. By making the testing wire or strip very thin and light so as to expose a large amount of surface in proportion to its bulk, it will attain a steady temperature in less time than if otherwise constructed, but in many cases, particularly when quickness of manipulation is desired, I prefer to use as a balancing resistance a coil or strip similar to the testing coil or spiral except that the balancing coil is surrounded by an atmosphere free from any inflammable gases, this may be introduced in the resistance $w$ as shown in Fig. 1 or arranged as shown in Fig. 3. In this case no account need be taken of the time in which the testing circuit is heating up, and thus attaining a constant resistance, as the two circuits heat up concurrently. This arrangement is shown diagrammatically in Fig. 3 and is preferably used in the portable apparatus described hereinafter; $A^{10}$, Fig. 3, being a housing containing a spiral S', similar to those used in the stations A' $A^2$, &c., arranged on a circuit $a^{10}$ $a^{11}$ and a galvanometer is arranged to indicate the relative amount of current in the two circuits $a^{10}$ $a^{11}$ and $a$ $a^2$, and keys are arranged in any convenient manner to close the line circuits and the testing circuit at will.

It is of course obvious that while I have shown but two testing stations A' $A^2$ that any number may be arranged on the line wire $a$.

In connection with the portable apparatus above referred to I prefer to use a particular form of galvanometer wound in a manner to be hereinafter explained, which is particularly adapted for rough work and is not disturbed by a small amount of jostling and is arranged to give quick readings. This portable instrument is shown in Fig. 5 where B, is a source of electricity which may be a battery or a small hand dynamo, or any other proper arrangement to generate a current, and $c$ $c'$ are binding screws on the plus and minus poles thereof respectively; $c^2$ $c^3$ being proper binding screws on the outside of the carrying case N.

From the battery or source of electricity, two electrical circuits are led, one, indicated in dot and dash lines from the binding screw $c$ to a galvanometer G' entering at $e'$, then through the galvanometer in a manner to be explained, out at $e$, through circuit $a$ $a'$, including the spiral S and when the key is depressed back to the minus pole $c'$ completing the circuit. The other circuit, indicated by full lines passes in similar fashion from the binding screw $c$ through the galvanometer entering at $e^3$ and emerging at $e^2$ to the spiral S and when the key K' is depressed, back to the minus pole $c'$ completing the circuit $a^{10}$ $a^{11}$. The key K' is preferably arranged, as shown, so that both circuits can close simultaneously. The spiral S is arranged in this form of instrument on the end of a pole T so that it can be poked into corners where inflammable gases are supposed to occur and is of course suitably covered by gauze and protected by guards $t$. The galvanometer G' is arranged with a needle $g'$ preferably pivoted on a stretched fiber $g^2$ and covered by glass plates $g^3$; an index plate $g^4$ is arranged as usual and by the amount of deflection of the needle the amount of inflammable gas can be ascertained. The galvanometer G' and spiral S' may be arranged as shown so that the light from the spiral S' will fall on the dial $g^4$ of the galvanometer to assist reading in dark places. These instrumentalities are all arranged in a portable box or carrying case N so as to be conveniently carried wherever desired. The most convenient form of apparatus has been shown in Fig. 5, but obviously any other proper indicator could be substituted for the indicator shown.

The galvanometer I prefer to use, consists of two electromagnets, each wound with two circuits in such a manner that when the amount of current in each is equal or when one current bears any other fixed and predetermined relation to the other, one of these electromagnets will be fully excited, and the other will be entirely unexcited; but when the currents in the two circuits vary from this fixed and predetermined ratio, then the excited magnet begins to lose a portion of its excitement while the previously unexcited magnet begins to get excited; and when the circuit in one branch ceases entirely, then the previously excited magnet loses all its excitement, and the previously unexcited magnet becomes fully excited. A galvanometer acting in this manner is shown in Figs. 6, 7 and 8, where P is a continuous bar of soft iron constituting a closed magnet circuit carrying exciting spools P' $P^2$ $P^3$ $P^4$ of which P' $P^3$ are traversed by one current, and $P^2$ $P^4$ by the other, and which are wound in such a manner that their magnetic effect is opposed to each other and wound with such a number of turns, that at the predetermined ratio of the two currents traversing them their magnetizing effect shall be equal. The effect of their being traversed by such currents will be the formation of consequent poles $p$ $p'$ between the magnetizing spools. The other electromagnet $R^3$ which is of the ordinary horse shoe type and preferably fitted with pole pieces $r'$ $r^2$ is placed so that its poles are on the same horizontal plane as the consequent poles of the first magnet, but at an angle, preferably a right angle, to the line joining the same. The exciting spools R' $R^2$ of this magnet are one or both wound with both circuits intimately interlaced with each other, and the number of turns on each is in the ratio determined as above, so that when the two currents have that ratio the magnet is unexcited.

A magnet needle as $g'$, preferably hung on a stretched fiber $g^2$ is arranged to swing between the magnets. The effect of which construction is, that when the current flowing in the two circuits is of the predetermined ratio the needle will point in the direction of a line joining the poles $p$ $p'$ and when the current flows only in one circuit it will point in the direction of a line joining the poles $r$ $r'$ of the other magnet and when it flows in both circuits in a relation different from the predetermined one the needle will point, in a direction intermediate to the two and at an angle proportional to the differences between the two currents. The advantage of this form of construction consists in the fact that the needle may be made very light and be made to move in a very strong field without external control, and it may therefore be made dead beat and also being to a great extent shielded is to that extent insensible to the external field in which the instrument may be placed. By having the needle suspended by a stretched fiber it is to a great extent independent of the position in which it is placed and even of such a slight degree of motion while giving indications as would be experienced by an instrument held in the hand.

By arranging the system as shown in Fig. 1, that is, by having one line wire (as $a$) running to all the stations and a return wire from each; or a common return wire and a separate line wire to each, nearly half the wire needed can be saved.

As shown in Figs. 3 and 6 it is possible by arranging contact points as $t^2$ at the point on the dial $g^4$ corresponding to the danger point and arranging a contact maker as $t^3$ on the needle and putting an alarm in a circuit whose terminals are the points $t^2$ an alarm may be given when the danger point is reached. It is also obviously possible, by suitable means, as by the reflection of a ray of light upon a moving sensitized surface, the movement of said ray of light being controlled by the apparatus as by a mirror fixed to the galvanometer or any other moving index, to obtain and preserve a continuous record of the condition of the air at any point as desired, the arrangement of instruments to obtain such result being of course perfectly apparent.

The operation of the apparatus is believed to be clearly understood from the foregoing description; the observer having put any desired station in circuit by means of the contact key the spiral S becomes heated and heats the surrounding air causing an upward current in the casing A, this draws in air containing gases, if any such are present, and the required indication is given at the observing station M'.

It may here be noted that if the inflammable gases or vapors are present in very large percentage in the air being tested, so as to be incapable of either exploding or supporting combustion their thermal capacity being relatively greater than air, the testing wire immersed in such an atmosphere will attain a lower final temperature under the influence of a given current of electricity than if immersed in a current of pure air. The effect is to give a backward indication or one in a contrary direction to that given by an appreciable quantity of gas. This however, does not confuse an observer as such change occurs quite suddenly at percentages immediately higher than those which give the maximum forward deflection.

It will be noticed that where I use the words "independent indicator" in the claims, I mean an indicator independent of the testing spiral.

Having now described my invention, what I claim as new, and desire to secure by Letters Patent, is—

1. In an apparatus for detecting the presence and amount of inflammable gases and vapor in air, the combination of a source of electrical supply, a circuit connected with the source of the electrical supply, a conductor of relatively high resistance arranged in said circuit and adapted to change its resistance under the influence of the electric current and any inflammable gas or vapor in the air, and an independent indicator for showing such changes of resistance.

2. In an apparatus for detecting the presence and amount of inflammable gases and vapors in air, the combination of a source of electrical supply a circuit connected with the source of electrical supply, a conductor of relatively high resistance arranged in said circuit and adapted to change its resistance under the influence of the electric current and any inflammable gas or vapor in the air, a second curcuit over which a current of electricity is also passed and means for comparing the resistances of the two circuits.

3. In an apparatus for detecting the presence and amount of inflammable gas or vapor mixed with air, the combination of a source of electrical supply, a circuit connected with the source of electrical supply, a conductor of relatively high resistance, arranged in said circuit and adapted to change its resistance under the influence of the electric current and any inflammable gas or vapor in the air a second circuit over which a current of electricity also passes, a rheostat for changing the resistance of this second circuit, and a galvanometer situated in a bridge connecting the two circuits substantially as and for the purpose specified.

4. In an apparatus for detecting the presence and amount of inflammable gases and vapors mixed with the air, the combination of a source of electrical supply, a circuit connected with the source of electrical supply, a conductor of relatively high resistance arranged in said circuit and adapted to change its resistance under the influence of the electrical current and any inflammable gas or vapor in the surrounding air, a second circuit over which in normal conditions is passed a current of electricity equal to that which is passed over the first named circuit, and means for comparing the resistances of the circuits when their equality is disturbed.

5. In an apparatus for detecting the presence and amount of inflammable gas or vapor mixed with the air, the combination with a source of electrical supply of a circuit connected to said source of electrical supply, a coil of wire as S arranged in a substantially vertical position, said coil having a relatively high resistance and arranged so as to be open to the air to be tested, and adapted to change its resistance under the influence of the electric current and the presence of inflammable gas or vapor, and an independent indicator arranged in the circuit and adapted to show the changes in the resistance thereof.

6. In an apparatus of the class described, the combination with a source of electrical supply, of a circuit connected with the source of electrical supply, a conductor of relatively high resistance arranged in said circuit, a casing arranged to protect this conductor from extraneous drafts and an independent indicator adapted to be arranged in the circuit and to show variations of resistance therein under the influence of any inflammable gas or vapor in the air surrounding the aforesaid conductor.

7. In an apparatus of the class described the combination with a source of electrical supply, of a circuit connected with the source of electrical supply, a conductor of relatively high resistance as spiral S arranged in said circuit, a chimney with non-conducting walls inclosing said spiral and an independent indicator substantially as and for the purpose specified.

8. In an apparatus of the class described the combination with a source of electrical supply of a circuit connected with the source of electrical supply a conductor of relatively high resistance as spiral S arranged in said circuit, a chimney with non-conducting walls inclosing said spiral, a casing arranged to protect the spiral from extraneous drafts, and an independent indicator, substantially as and for the purpose specified.

9. In an apparatus of the class described the combination of a source of electrical supply, a circuit connected therewith, a conductor as S of relatively high resistance inserted in said circuit, a box or chest surrounding said conductor, a chimney surrounding the spiral and wire gauze inclosing the conductor S on either side so that gases or vapors heated between the sheets of gauze may not inflame the surrounding gas or vapor.

10. In an apparatus of the class described a source of electrical supply in combination with a line wire leading from such source of electrical supply, a series of conductors of high resistance connected to said line wire, a series of return wires adapted to complete the circuit, one connected to each said conductor of high resistance, an indicator and means adapted to complete the circuit through each wire and said indicator at will.

11. In an apparatus of the character described a source of electrical supply, a conductor of relatively high resistance inserted in said circuit which conductor is adapted to change its resistance under the influence of the electric current and inflammable gas and vapor and an independent electrical testing instrument to indicate the changes in the resistance in combination with a portable box as N, in which the above mentioned instrumentalities are arranged.

12. In an instrument of the character described a source of electrical supply, a circuit as $a\ a'$ connected therewith and having a conductor of relatively high resistance inserted in said circuit, a second circuit as $a^{10}\ a^{11}$ through which a current of electricity also passes, in combination with a galvanometer having cores around which the currents in the circuits $a, a'$, and $a^{10}, a^{11}$, pass, forming two electro-magnets which are wound in such a manner that when the amount of current in one circuit is equal or bears a certain relation to the amount of current in the other, one of these magnets will be excited to its maximum degree and the other will be unexcited, while if the relative amount of current in the two circuits varies from this predetermined ratio the previously excited magnet becomes less excited and the magnet which was not excited becomes so, and also having a needle acted upon by said electro magnets and adapted to indicate the variations in the intensities of the currents in the two circuits.

13. In an instrument of the character described the combination of a source of electrical supply a circuit as $a\ a'$ connected therewith having a coil S of relatively high resistance inserted therein, a second circuit as $a^{10}\ a^{11}$, a spiral S' inserted therein, a galvanometer G' connected with the two circuits and adapted to show the differences in resistance therein, the coil S' and galvanometer being so arranged relatively to each other that the light from the spiral will be thrown on the dial of the galvanometer.

14. The method of detecting the presence and amount of inflammable gas and vapor mixed with air which consists in passing two currents of electricity, one through a circuit in which is inserted a conductor adapted to change its resistance under the influence of the current of electricity and the presence of inflammable gas or vapor and the other current through a circuit not influenced by the inflammable gas or vapors, and comparing the resistance of the two circuits.

15. The method of detecting the presence and amount of air or inflammable gas or vapor present in the air which consists in passing a current of electricity through a circuit including a conductor of relatively high resistance and so heating the conductor, causing a current of air to flow around said heated conductor by the heat of the conductor itself and measuring the difference of resistance in the circuit due to the presence of any inflammable gas or vapor in the air rising round the conductor substantially as described.

BENJAMIN C. TILGHMAN, JR.

Witnesses:
ALF. H. FABER,
EDW. F. AYRES.